(12) United States Patent
Barry et al.

(10) Patent No.: US 7,693,130 B2
(45) Date of Patent: Apr. 6, 2010

(54) APPARATUS AND METHOD OF SYNCHRONIZING DISTRIBUTION OF PACKET SERVICES ACROSS A DISTRIBUTED NETWORK

(75) Inventors: Charles F. Barry, Santa Clara, CA (US); Reed A. Parker, Saratoga, CA (US); Tian Shen, Cupertino, CA (US); Feng F. Pan, San Jose, CA (US); Meenakshi Subramanian, Santa Clara, CA (US)

(73) Assignee: Brilliant Telecommunications Inc., Campbell, CA (US)

( * ) Notice: Subject to any disclaimer, the term of this patent is extended or adjusted under 35 U.S.C. 154(b) by 0 days.

(21) Appl. No.: 11/843,539

(22) Filed: Aug. 22, 2007

(65) Prior Publication Data

US 2008/0137691 A1 Jun. 12, 2008

Related U.S. Application Data

(60) Provisional application No. 60/839,549, filed on Aug. 22, 2006.

(51) Int. Cl.
*H04J 3/06* (2006.01)
(52) U.S. Cl. .................... 370/350; 370/503; 370/509; 370/512; 370/516; 370/229; 370/328
(58) Field of Classification Search ............... 370/503, 370/508, 509, 512, 516, 229, 230, 235, 301, 370/328, 331, 350, 412
See application file for complete search history.

(56) References Cited

U.S. PATENT DOCUMENTS

| | | | | |
|---|---|---|---|---|
| 5,640,679 | A * | 6/1997 | Lundqvist et al. ........... 455/525 |
| 6,320,861 | B1 * | 11/2001 | Adam et al. ............. 370/395.7 |
| 6,360,271 | B1 * | 3/2002 | Schuster et al. ............. 709/231 |
| 6,647,428 | B1 | 11/2003 | Bannai et al. |
| 6,680,912 | B1 | 1/2004 | Kalman et al. |
| 6,865,149 | B1 | 3/2005 | Kalman et al. |
| 7,251,256 | B1 | 7/2007 | Barry et al. |
| 7,346,352 | B2 * | 3/2008 | Colban et al. ............... 455/442 |
| 7,349,359 | B2 * | 3/2008 | Chang et al. ................ 370/312 |
| 2001/0040902 | A1 * | 11/2001 | Rao ........................... 370/519 |
| 2002/0141360 | A1 * | 10/2002 | Baba et al. .................. 370/331 |
| 2003/0037146 | A1 * | 2/2003 | O'Neill ...................... 709/226 |
| 2003/0216155 | A1 * | 11/2003 | Kobayashi .................. 455/561 |
| 2004/0092275 | A1 * | 5/2004 | Krasner et al. ............. 455/502 |
| 2005/0025090 | A1 * | 2/2005 | Klein et al. ................. 370/328 |

(Continued)

OTHER PUBLICATIONS

"Synchronization Services for NGN, Applications and Deployment Challenges," Cisco Systems, Inc., WSTS'07, Boulder-Mar. 14, 2007.

*Primary Examiner*—Kwang B Yao
*Assistant Examiner*—Nguyen Ngo
(74) *Attorney, Agent, or Firm*—Cooley Godward Kronish LLP

(57) ABSTRACT

An apparatus and method are described for synchronizing distribution of packet information. In one embodiment, the invention includes timestamp processing logic to process a transmit time indicator embedded within the packet information, where the transmit time indicator is based on a time reference, and service synchronization queuing logic to hold the packet information until a time offset after the transmit time indicator, where the service synchronization queuing logic is synchronized to the time reference.

19 Claims, 6 Drawing Sheets

U.S. PATENT DOCUMENTS

| | | | |
|---|---|---|---|
| 2006/0077994 A1* | 4/2006 | Spindola et al. | 370/412 |
| 2007/0047591 A1* | 3/2007 | Senthilnathan et al. | 370/503 |
| 2007/0171853 A1* | 7/2007 | Jones et al. | 370/328 |
| 2007/0189282 A1* | 8/2007 | Lohr et al. | 370/370 |
| 2007/0263581 A1* | 11/2007 | Benveniste | 370/338 |

* cited by examiner

APPARATUS AND METHOD OF SYNCHRONIZING DISTRIBUTION OF PACKET SERVICES ACROSS A DISTRIBUTED NETWORK

CROSS-REFERENCE TO RELATED APPLICATIONS

This application claims priority to U.S. Provisional Application Ser. No. 60/839,549, filed Aug. 22, 2006, which is incorporated by reference in its entirety.

FIELD OF THE INVENTION

The present invention relates generally to processing of packet traffic in computer networks. More particularly, this invention is directed towards synchronizing distribution of packet services across a distributed network. An example is synchronizing the distribution of real-time streaming services to mobile users.

BACKGROUND OF THE INVENTION

In recent years, there has been a rapid increase in demand for delivery of real-time applications and services over distributed networks. Distributed networks, especially those in which subscriber devices are mobile, commonly hand off subscriber devices from access station to access station as those devices move in the network. The goal of handoffs is to keep ongoing services to a mobile subscriber operating, ideally without any decrease in service quality, by ensuring that those ongoing services are provided by the access station(s) that best serve the mobile subscriber at any time. During a handoff, a subscriber device may measure the quality of incoming links from multiple access stations, using a metric such as received signal power or bit error rate. When the quality of the incoming link from a first access station providing a service to the subscriber device becomes sufficiently poor relative to the quality of an incoming link from a second access station, the subscriber device may switch to receiving the service from the second access station.

FIG. 1 illustrates a packet service 120 distributed from a source 100 to a subscriber 130 via a distributed network 140. The packet service 120 traverses the network 140 to multiple access stations 110 and 112 via paths 121 and 122. The access stations 110 and 112 transmit the packet service to subscriber 130. During a handoff, subscriber 130 may switch from receiving the packet service 120 from access station 110 to receiving the packet service 120 from access station 112. Each access station may be a base transceiver station (base station) and subscriber 130 may be a mobile user.

One difficulty that arises in handing off the packet service 120 if the packet service 120 is a real-time service, such as streaming video, is that the packets of the packet service 120 (traversing paths 121 and 122) are not synchronized at the access stations 110 and 112. This means that when subscriber 130 is handed off from the access station 110 to the access station 112, the packet stream representing the packet service 120 transmitted by the access station 112 may be ahead of or behind the packet stream representing the packet service 120 transmitted by the access station 110.

FIG. 2 illustrates an example of the potential extent of the mismatch of the arrival times of a given packet of the packet service 120 at access stations 110 and 112. The amount of the time mismatch is primarily defined by packet delay and packet delay variation, or jitter, experienced by the packet on paths 121 and 122. The packet on path 121 experiences a minimum network delay 202 and a network jitter that may be any value between zero and a worst-case network jitter 204. The packet on path 122 experiences a minimum network delay 222 and a network jitter that may be any value between zero and a worst-case network jitter 224. In this example, the minimum network delay 202 and the minimum network delay 222 are generally different due primarily to differences in transmission delay and minimum processing delay on paths 121 and 122. Transmission delay is the delay due to the distance that a signal travels at the speed of light over a given physical medium, and is generally different on paths 121 and 122 because access stations 110 and 112 are generally located at different physical locations. Minimum processing delay is the minimum delay due to processing, including queuing, of the packet by devices traversed by the packet. This delay may be different on paths 121 and 122 because a packet on each path generally traverses different sets of devices and/or different internal paths within the devices. The network jitter is often highly variable in packet networks, as well as path-dependent. This variation results from, for example, variable queuing delays due to multiplexing of multiple streams of burst traffic at devices traversed by a packet on paths 121 and 122, and the interaction of these delays with the operation of network protocols such as the Transmission Control Protocol (TCP). The worst-case network jitter 204 and 224 is the highest value of network jitter on paths 121 and 122, respectively. A given packet on paths 121 and 122 experiences an actual network jitter that may range between zero and the worst-case network jitter 204 and 224, respectively.

The smallest time for a packet transmitted by source 100 on path 121 to reach access station 110, the smallest delay 210, is in this example equal to the minimum network delay 202. The largest time for a packet transmitted by source 100 on path 121 to reach access station 110, the largest delay 212, is in this example equal to the sum of the minimum network delay 202 and the worst-case network jitter 204. Similarly, the smallest time for a packet transmitted by source 100 on path 122 to reach access station 112, the smallest delay 230, is in this example equal to the minimum network delay 222. The largest time for a packet transmitted by source 100 on path 122 to reach access station 112, the largest delay 232, is in this example equal to the sum of the minimum network delay 222 and the worst-case network jitter 224. The worst-case time mismatch 250 of packet arrivals at access stations 110 and 112 is the difference between the largest delay 212 on path 121 and the smallest delay 230 on path 122. The actual time mismatch for a given packet at access stations 110 and 112 may range anywhere from near zero to the worst-case time mismatch 250.

In most well designed networks, the largest delay 212 and 232 for well upwards of 99% of the packets is under a reasonable limit, such as 100 milliseconds. If the extent of the network is small, the minimum network delay 202 and 222 for packets to traverse the network from source 100 to access stations 110 and 112 may be far less than 100 milliseconds. However, some packets in this network may experience worst-case network jitter 204 and 224 of near 100 milliseconds. Based on FIG. 2, this means that the worst-case time mismatch 250 of packet arrivals at access stations 110 and 112 is also near 100 milliseconds. This means that when subscriber 130 switches from access station 110 to access station 112 during a handoff, subscriber 130 may miss 100 milliseconds of packet service 120. This is because, in this example, the packet stream representing the packet service 120 transmitted by the access station 112 is ahead of the packet stream representing the packet service 120 transmitted by the access station 110. This significant worst-case time mismatch may degrade the quality of real-time services during a handoff because a significant amount of packet information may be lost or multiply received. An example of the quality degradation that may result is severe glitching of real-time video or even dropping of the packet service 120.

The effect of jitter on the packet service 120 can be reduced, in one existing approach, by delaying received packets of the packet service 120 at network endpoints, such as a network device on paths 121 or 122 just prior to access stations 110 or 112, respectively. These received packets are accumulated in a receive queue on each of paths 121 and 122 for packet service 120 at service initiation. The effect of these receive queues is to replace the worst-case network jitter 204 and 224 with delay by increasing the minimum network delay 202 and 222 on paths 121 and 122. However, even a significant reduction in worst-case network jitter 204 and 224 does not eliminate the time mismatch of packet arrivals at access stations 110 and 112, or the quality degradation of real-time services that occurs on handoffs when this time mismatch exists. The amount of delay added to paths 121 and 122 on service initiation, whether just constant across network endpoints or based on estimates of the worst-case network jitter 204 and 224, does not ensure that the total delay on paths 121 and 122 is equal, which is required to eliminate the time mismatch. This receive queuing approach may even increase the time mismatch of packet arrivals at access stations 110 and 112, and the corresponding quality degradation of real-time services. One reason for this is that the amount of delay added to paths 121 and 122 generally does not correspond to the fill level of the receive queues at initiation of the packet service, because the packets used to fill the receive queues at service initiation usually have experienced highly variable network jitter.

To address these shortcomings, it would be desirable to provide a method of synchronizing packet services over a distributed network by eliminating the time mismatch of arrivals of packets of a real-time packet service at access stations such as base stations. It would also be desirable to provide a network device that can facilitate the synchronization of packet services over this distributed network.

SUMMARY OF THE INVENTION

An apparatus and method are described for synchronizing distribution of packet information. One embodiment of the invention includes timestamp processing logic to process a transmit time indicator embedded within the packet information, where the transmit time indicator is based on a time reference, and service synchronization queuing logic to hold the packet information until a time offset after the transmit time indicator, where the service synchronization queuing logic is synchronized to the time reference.

A method is also described for providing packet information to a communication device in a distributed packet network, including processing packet information to obtain a transmit time indicator based on a timing reference at a first network device and a second network device, delaying transmission of the packet information at the first network device and the second network device, based on the transmit time indicator and a time offset available to the first network device and the second network device, providing the packet information to the communication device from a first network device, and providing the packet information to the communication device from a second network device, where the second network device is synchronized to the first network device based on the timing reference.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 1:
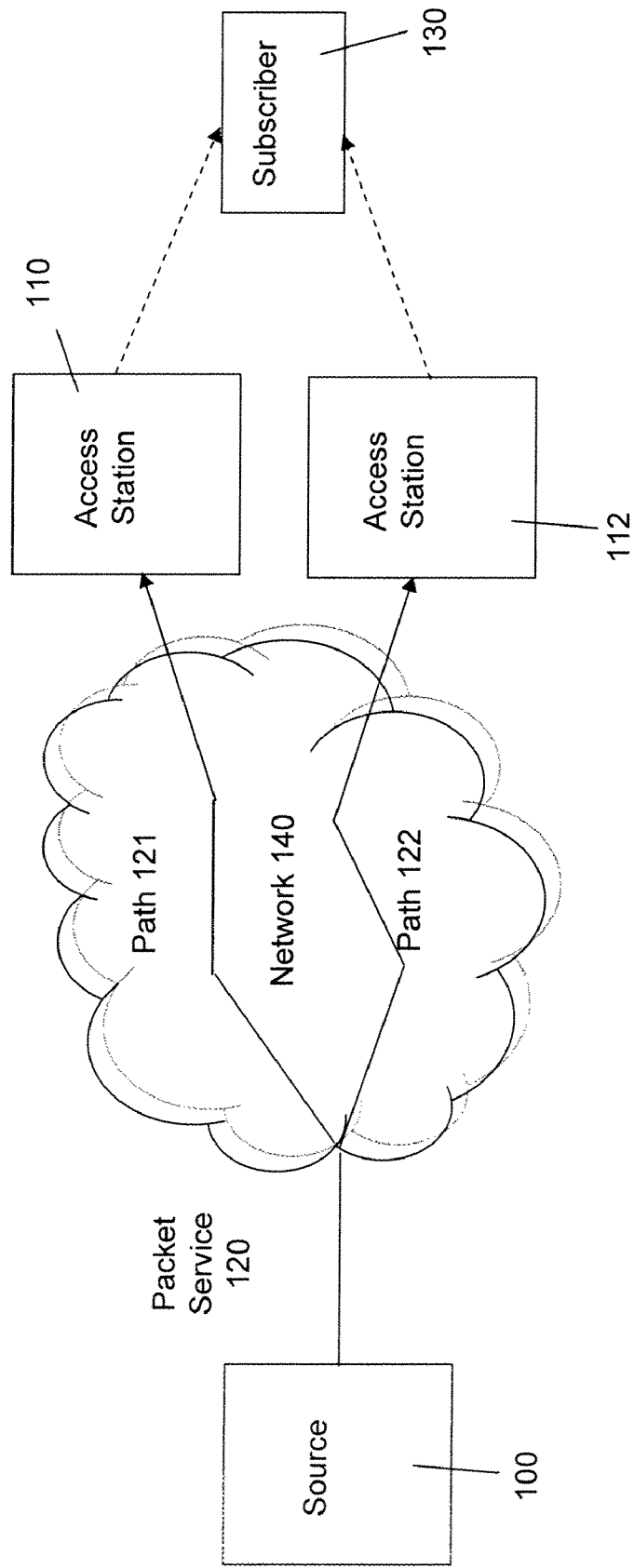
FIG. 1 illustrates a packet service distributed from a source to a subscriber via a distributed network, in accordance with the prior art.
Figure 2:
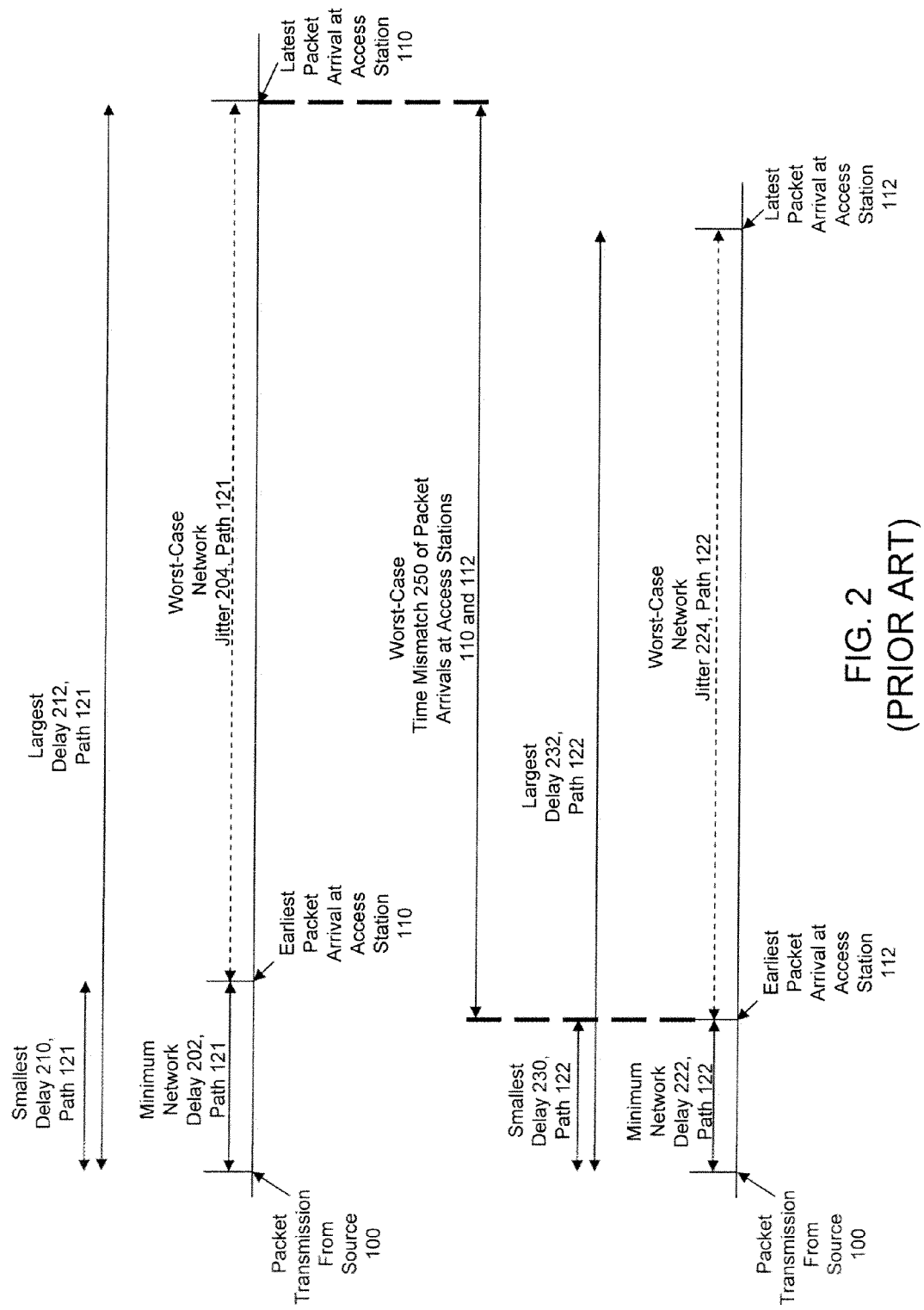
FIG. 2 illustrates an example of the potential extent of the mismatch of the arrival times of a given packet of a packet service at multiple access stations, in accordance with prior art.

Delivery of real -time packet services over a distributed network, especially one in which subscriber devices are mobile, requires precise time agreement by end access stations, such as base stations, in order to provide seamless, synchronized handoffs from access station to access station as the subscribers move in the network. Synchronized handoffs require that the packet streams representing a packet service be synchronized upon egress of each access station such that the subscriber experiences a seamless stream. For a packet service to be synchronized across access stations, copies of each packet of the packet service should arrive simultaneously, or nearly simultaneously within some acceptable error tolerance for the real-time packet service, at each access station receiving the packet service. To eliminate the time mismatch of these packet arrivals at the access stations, the network should contain functionality that determines, on a per packet basis, how long to delay each packet to compensate for differences in minimum network delay and actual network jitter experience by the packet across the network. We refer to this functionality as service synchronization queuing.

One convenient way to implement service synchronization queuing is to insert a service synchronization queuing device (or queue sync device) prior to each access station to insert this per packet delay. The queue sync device may also be part of the access station, and may be located just prior to hardware that performs the actual packet transmission to the subscriber. To enable the queue sync device to precisely determine when to transmit each packet to an access station, a common time reference should be provided to the source of the real-time packet service and to each queue sync device. This time reference may be provided by a global navigation satellite system (GNSS), including but not limited to the Global Positioning System (GPS), Galileo, GLONASS, and Beidou. The time reference may be provided by a terrestrial radio system, including but not limited to WWVB and DCF- 77. The time reference may be provided by a network time server, including but not limited to a Network Time Protocol (NTP) server, a Precision Time Protocol (PTP) grandmaster, and Synchronous Ethernet. The time reference may also be provided by any other highly accurate time reference sufficient for the real-time application running over the distributed network, including but not limited to a lower Stratum level time reference. The source device can insert a transmit time indicator into each packet, such as a timestamp based on the common time reference. Time-stamping of packets may be performed by a time-stamp protocol such as the Real-Time Protocol (RTP) that derives its time base and reference from a device timed to the common time reference, such as a NTP server. Each queue sync device can then precisely determine the time to transmit each packet based on the transmit time indicator in the packet.

To synchronize packet arrivals transmitted by multiple queue sync devices each queue sync device should apply a common time offset to the transmit time indicator in each packet to determine when to transmit the packet to its downstream access station. This time offset may be configurable, such as by the network operator, or automatically determined at times including connection setup. This time offset may also be common to all queue sync devices and all packet services, or may be for a subset of queue sync devices and/or a subset of packet services. The network operator may determine a worst-case delay for some portion of packet traffic traversing some set of paths, such as packets of a given packet service. This determination may be through, for example, trending of network measurements of packet delay and jitter. From this worst-case delay, the network operator can set the time offset as some value greater or equal to this worst-case delay. The network may also automatically determine this worst-case delay. One potential approach is for each queue sync device to locally estimate the worst-case delay for some subset of packets, such as packets of a given packet service, then for each queue sync device to communicate this information to at least the other queue sync devices receiving this packet service. Each queue sync device can then determine the time offset as some value greater or equal to the largest worst-case delay estimated by any queue sync device receiving the packet service.

Using a common time offset, the queue sync devices ensure that packets of a packet service are synchronized upon egress of each access station so that copies of each packet transmitted by the source are broadcast, multicast, anycast, or unicast from the participating end stations to the participating subscribers at the same time. In the case that the end subscribers are on a Time Division Multiple Access (TDMA) network or a packet-based wireless network (IEEE 802.11 or 802.16), the end packet broadcast may be replicated into several transmissions that occur on the media at approximately the same time such that the handoffs are still seamless with respect to the particular subscriber.

Figure 3:
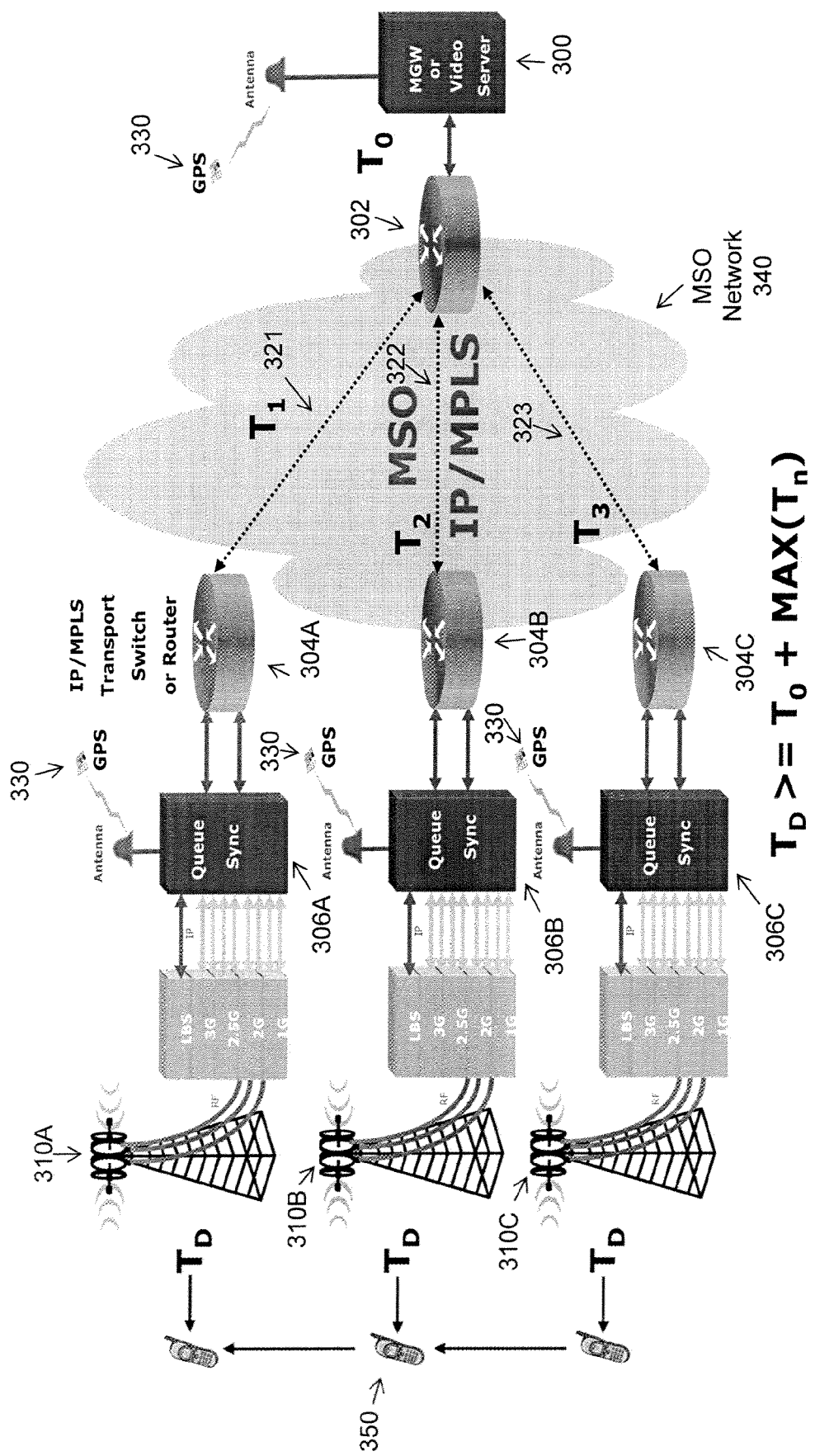
FIG. 3 illustrates an example of a distributed network that synchronizes a packet service across base stations, in accordance with one embodiment of the present invention.

FIG. 3 illustrates an example of a distributed network that synchronizes a packet service across base stations, in accordance with one embodiment of the present invention. The network eliminates the time mismatch of arrivals of packets of a real-time packet service at the three base stations 301A, 310B, and 310C shown, and thus enables seamless handoffs of subscriber 350 between base stations 310. In this example, a media gateway 300 is the source of a packet stream representing the packet service on paths 321, 322, and 323 shown. More generally, the source may be any network device transmitting a real-time packet service, such as a video server. The packet service may be a broadcast packet stream, a multicast packet stream, an anycast packet stream, a plurality of unicast packet streams, or some combination of the above types of packet streams. The media gateway 300 may time-stamp each transmitted packet based on GPS time reference 330. The time of the packet transmission at the media gateway 300 is $T_0$. Each packet may traverse the network to a set of base stations 306 as determined by a broadcast, multicast, anycast, or unicast routing protocol. In this example, each packet traverses the network to base stations 306A, 306B, and 306C along paths 321, 322, and 323, respectively. Paths 321, 322, and 323 go from media gateway 300 to network switch 302, then diverge at the boundary of a multi-service operator (MSO) network 340. In this example, the MSO network 340 is carrying Internet Protocol (IP) packets over Multi-Protocol Label Switching (MPLS) tunnels. More generally, the MSO network 340 may be any network that can support and/or transport broadcast, multicast, anycast, and unicast packet services. Path 321 continues to a network switch 304A, then to a queue sync device 306A, then to base station 310A. Path 322 continues to a network switch 3043, then to a queue sync device 306B, then to base station 310B. Path 323 continues to a network switch 304C, then to a queue sync device 306C, then to base station 310C. The end-to-end delays for a given packet transmitted from the media gateway 300, including both minimum network delay and actual network jitter, on paths 321, 322, and 323 are $T_1$, $T_2$, and $T_3$, respectively. The queue sync devices 306A, 306B, and 306C also receive the GPS time reference 330. In this example, the time offset is greater than or equal to $Max(T_n)$ where $Max(T_n)$ is the worst-case delay for packets transmitted on paths 321, 322, and 323. As illustrated in FIG. 3, $T_D$ the desired transmission time to the subscriber from the base station is therefore greater than or equal to the sum of $T_0$ and $Max(T_n)$. The queue sync devices 306A, 306B, and 306C may be collocated with or included as part of the base stations 310A, 310B, and 310C, respectively. The difference between $T_D$ and the transmit time from each queue sync device 306 to each base station 310 should be sufficiently small and unvarying as to be insignificant to the operation of any packet service.

Figure 4:
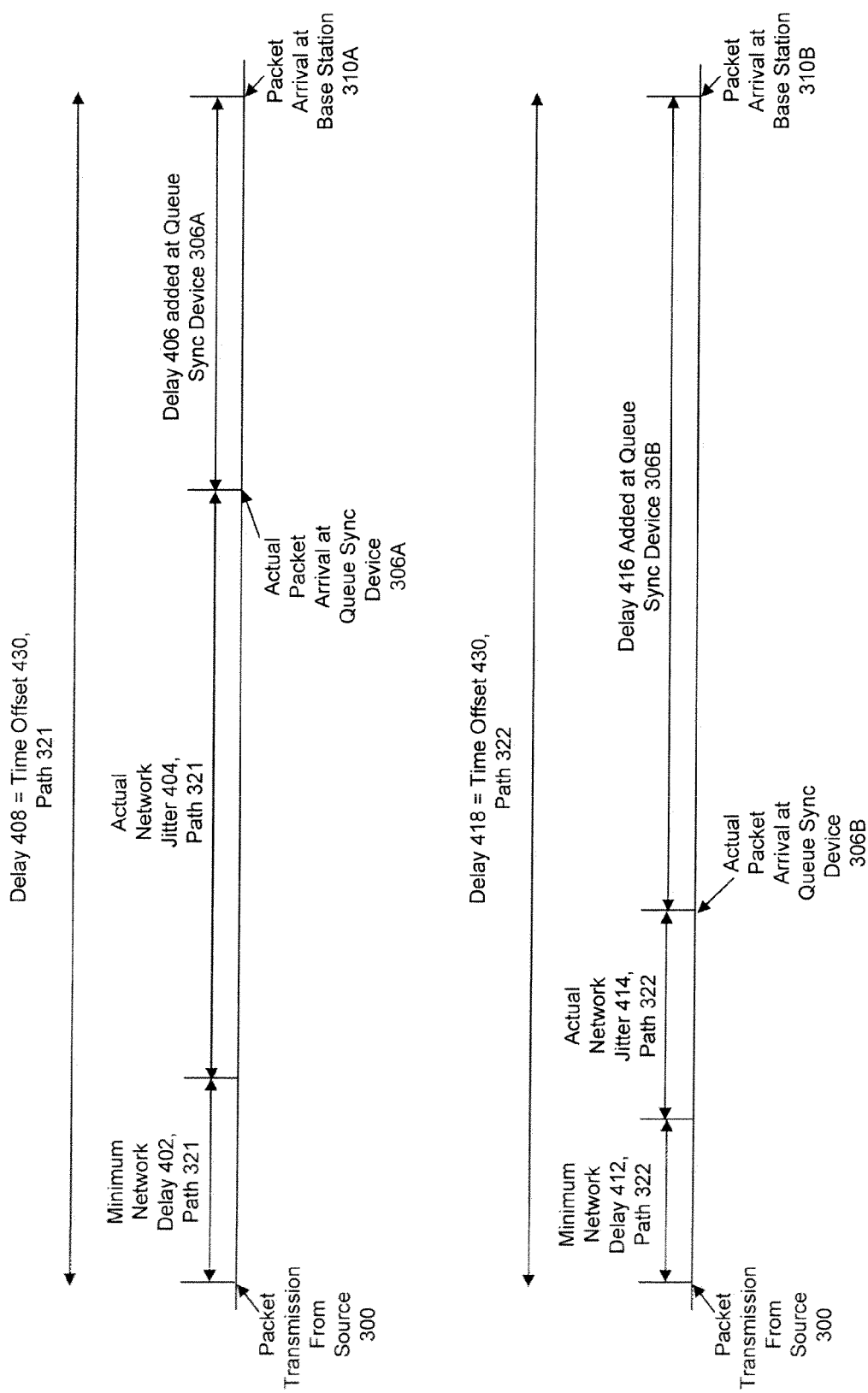
FIG. 4 illustrates the operation of the network of FIG. 3 to synchronize a packet service across base stations, in accordance with one embodiment of the present invention.

FIG. 4 illustrates the operation of the network of FIG. 3 to synchronize a packet service across base stations, in accordance with one embodiment of the present invention. A packet transmitted from the source media gateway 300 experiences a delay along path 321 including minimum network delay 402 and actual network jitter 404 before arrival at queue sync device 306A, and a delay along path 322 including minimum network delay 412 and actual network jitter 414 before arrival at queue sync device 306B. The delay along path 321 is different from the delay along path 322. Queue sync devices 306A and 306B delay the packet by delays 406 and 416, respectively. Delays 406 and 416 are determined based on the transmit time indicator in the packet and time offset 430. Because queue sync devices 306A and 306B have a common time reference 330, the queue sync devices 306A and 306B can apply the time offset 430 to the transmit time indicator in the packet to determine the time to transmit the packet to base stations 310A and 310B, respectively, which is assumed to be essentially the same time that the packet arrives at base stations 310A and 310B. Therefore, the end-to-end delays 408 and 418 on paths 321 and 322 are essentially equal, with any difference being sufficiently small and unvarying as to be insignificant to the operation of any packet service, so the arrival of the packet at base stations 310A and 310B is synchronized. The actual network jitter 404 and 414 may vary significantly from packet to packet, but since the time offset 430 remains the same, the delays 408 and 418 will remain essentially equal.

Figure 5:
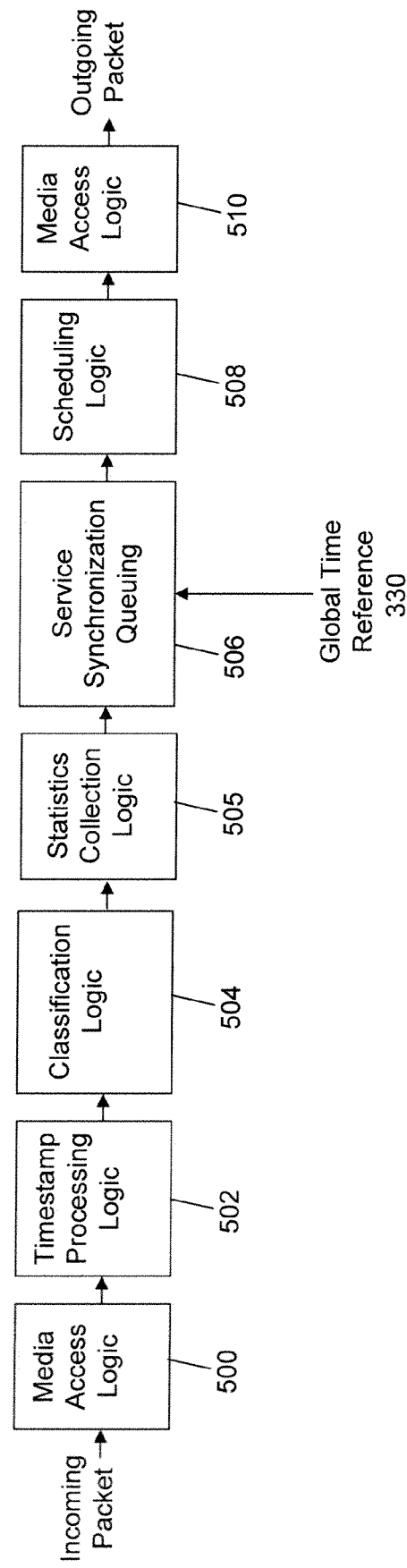
FIG. 5 illustrates a logical block diagram of the main functional blocks of a queue sync device, in accordance with one embodiment of the present invention.

FIG. 5 illustrates a logical block diagram of the main functional blocks of a queue sync device 306, in accordance with one embodiment of the present invention. The queue sync device 306 may be implemented as one or more integrated circuits, field programmable gate arrays, network processors, or other configurable or programmable hardware components. A packet is received by the queue sync device 306 at media access logic 500. The media access logic 500 may perform receive functions associated with the physical layer and media access control sublayer of the Open Systems Interconnection (OSI) reference model for networking protocol layers. The timestamp processing logic 502 may then process the packet to obtain the transmit time indicator embedded within the packet by the source 300. The classification logic 504 may then process the packet to associate the packet with a packet service. This association is needed if there is a separate time offset 430 per packet service, and to enable statistics collection per packet service. The statistics collection logic 505 may then collect statistical information about the packet, such as the network delay and jitter experienced by the packet The service synchronization queuing logic 506 then may apply the time offset associated with the packet service to the transmit time indicator in the packet to determine a transmit time for the packet. When the global time reference 330 indicates that the transmit time for the packet has arrived, then the service synchronization queuing logic 506 indicates this to the scheduling logic 508. The scheduling logic 508 may indicate to the service synchronization queuing logic 506 which queue to transmit a packet from, if for example the service synchronization queuing logic 506 contains a separate queue per packet service. The packet is then transmitted to media access logic 510 and subsequently transmitted to the base station 310.

Figure 6:
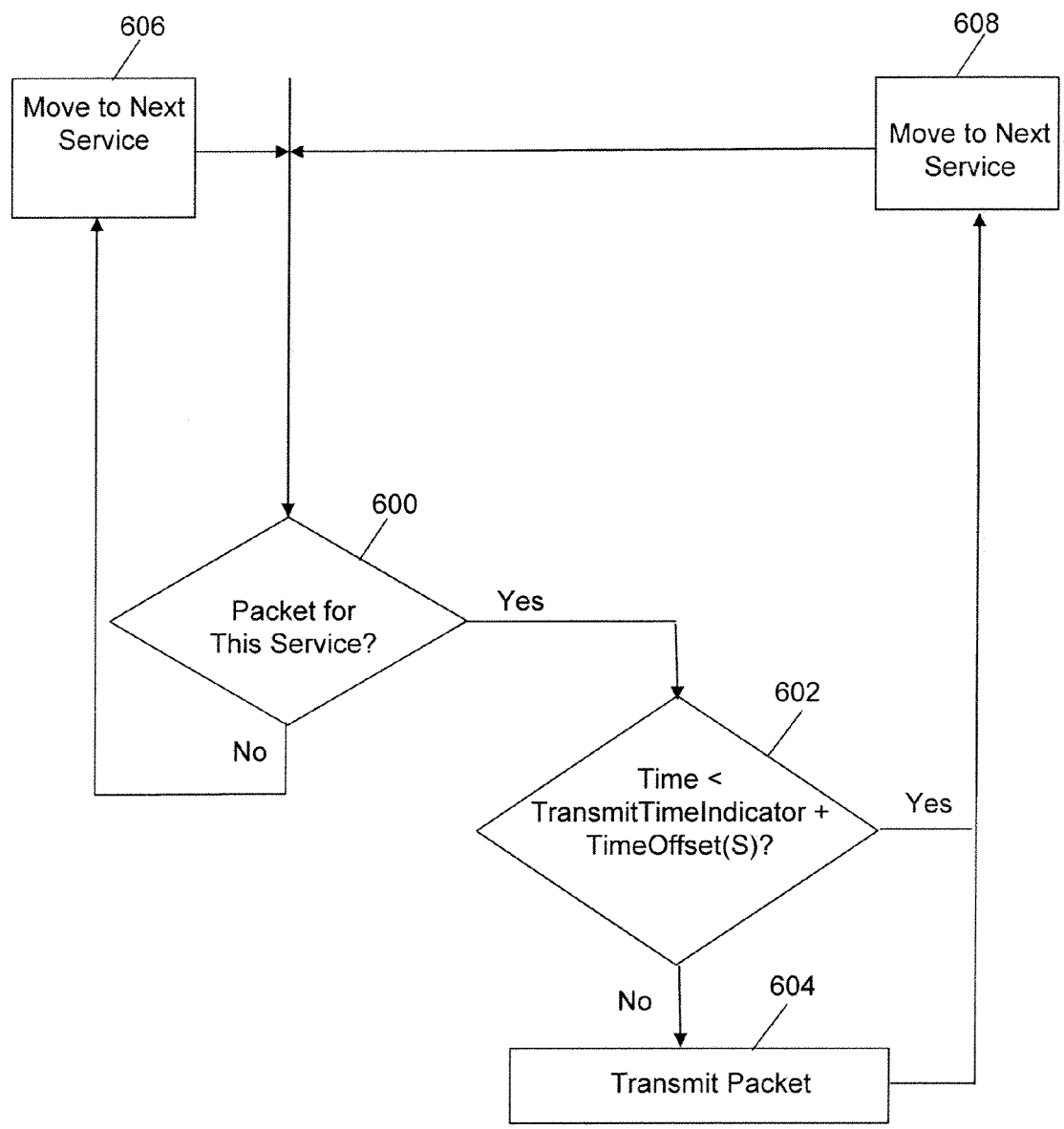
FIG. 6 illustrates operations associated with scheduling transmission of packets associated with multiple packet services, in accordance with one embodiment of the present invention.

FIG. 6 illustrates operations associated with scheduling transmission of packets associated with multiple packet services, in accordance with one embodiment of the present invention. The scheduling logic 508 checks with the service synchronization queuing logic 506 if a packet is queued for a packet service (block 600). If not, the scheduling logic 508 moves to the next packet service (block 606). If there is a packet queued for this packet service, then the scheduling logic 508 checks with the service synchronization logic 506 if the time indicated by the global time reference 330 is earlier than the transmit time indicator in the packet plus the time offset associated with the packet service (block 602). If the time indicated by the global time reference 330 has reached the transmit time indicator in the packet plus the time offset associated with the packet service, then the scheduling logic 508 transmits the packet (block 604) then moves on to the next packet service (block 608). If not, the scheduling logic moves to the next packet service (block 608).

From the foregoing, it can be seen that an apparatus and method for synchronizing distribution of packet services across a distributed network are described. The foregoing description, for purposes of explanation, used specific nomenclature to provide a thorough understanding of the invention. It will be appreciated, however, that embodiments of the invention can be in other specific forms without departing from the spirit or essential characteristics thereof. The described embodiments are not intended to be exhaustive or to limit the invention to the precise forms disclosed; obviously, many modifications and variations are possible in view of the above teachings. The presently disclosed embodiments are, therefore, considered in all respects to be illustrative and not restrictive. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. An system for synchronizing distribution of packet information, comprising:
at each of a plurality of devices:
first logic to transmit first estimated delay information to each of the other devices in the plurality of devices;
second logic to determine a time offset for the packet information based on the first estimated delay information and second estimated delay information received from each of the other devices in the plurality of devices;
timestamp processing logic to process a transmit time indicator embedded within the packet information, wherein the transmit time indicator is based on a time reference; and
service synchronization queuing logic to hold the packet information until the time offset after the transmit time indicator, wherein the service synchronization queuing logic is synchronized to the time reference;
wherein the time offset determined by each of the plurality of devices is not communicated to any of the other devices in the plurality of devices; and
wherein each of the plurality of devices determines the time offset without being controlled by a central device.

2. The system of claim 1, further comprising classification logic at each of the plurality of devices to associate the packet information with at least one packet service, wherein each packet service is at least one of a broadcast packet stream, a multicast packet stream, an anycast packet stream, and a plurality of unicast packet streams.

3. The system of claim 2, wherein the time offset is determined per packet service.

4. The system of claim 2, further comprising scheduling logic at each of the plurality of devices to schedule transmission of packet information associated with each packet service.

5. The system of claim 2, wherein the transmit time indicator is a timestamp field in a packet.

6. The system of claim 2, wherein the time reference is provided by at least one of a global navigation satellite system, a terrestrial radio system, and a network time server.

7. The system of claim 1, further comprising:
statistics collection logic at each of the plurality of devices to collect a first plurality of network delay measurements associated with the packet information, and to estimate the first estimated delay information based on the first plurality of network delay measurements;
wherein the first estimated delay information includes a first maximum delay that is greater than or equal to any of the first plurality of network delay measurements.

8. The system of claim 7, wherein:
the second estimated delay information is based on a second plurality of network delay measurements associated with the packet information;
the second estimated delay information includes a second maximum delay that is greater than or equal to any of the second plurality of network delay measurements; and
the second logic determines the time offset as greater than or equal to the first maximum delay and the second maximum delay.

9. A method for synchronizing distribution of packet information, comprising:
at each of plurality of devices:

receiving the packet information;

transmitting first estimated delay information to each of the other devices in the plurality of devices;

determining a time offset for the packet information based on the first estimated delay information and second estimated delay information received from each of the other devices in the plurality of devices;

processing a transmit time indicator embedded within the packet information, wherein the transmit time indicator is based on a time reference; and holding the packet information until the time offset after the transmit time indicator, wherein the time offset is determined using the time reference;

wherein the time offset determined by each of the plurality of devices is not communicated to any of the other devices in the plurality of devices; and wherein each of the plurality of devices determines the time offset without being controlled by a central device.

10. The method of claim 9, further comprising classifying the packet information at each of the plurality of devices to associate the packet information with at least one packet service, wherein each packet service is at least one of a broadcast packet stream, a multicast packet stream, an anycast packet stream, and a plurality of unicast packet streams.

11. The method of claim 10, wherein the time offset is determined per packet service.

12. The method of claim 10, further comprising scheduling a transmission at each of the plurality of devices of packet information associated with each packet service.

13. The method of claim 10, wherein the transmit time indicator is a timestamp field in a packet.

14. The method of claim 10, wherein the timing reference is provided by at least one of a global navigation satellite system, a terrestrial radio system, and a network time server.

15. The method of claim 9, further comprising:
at each of the plurality of devices:
collecting a first plurality of network delay measurements associated with the packet information; and
estimating the first estimated delay information based on the first plurality of network delay measurements;
wherein the first estimated delay information includes a first maximum delay that is greater than or equal to any of the first plurality of network delay measurements.

16. The method of claim 15, wherein:
the second estimated delay information is based on a second plurality of network delay measurements associated with the packet information;
the second estimated delay information includes a second maximum delay that is greater than or equal to any of the second plurality of network delay measurements; and the time offset is greater than or equal to the first maximum delay and the second in maximum delay.

17. A method for providing packet information to a communication device in a distributed packet network, comprising:
communicating first estimated delay information determined by a first network device to a second network device;
communicating second estimated delay information determined by the second network device to the first network device;
determining a time offset for the packet information at the first network device and the second network device based on the first estimated delay information and the second estimated delay information;
processing the packet information to obtain a transmit time indicator based on a timing reference at the first network device and the second network device;
delaying transmission of the packet information at the first network device and the second network device, based on the transmit time indicator and the time offset;
providing the packet information to the communication device from a first network device; and
providing the packet information to the communication device from a second network device, wherein the second network device is synchronized to the first network device based on the timing reference;
wherein the time offset determined by the first network device is not communicated to the second network device; and
wherein the time offset determined by the second network device is not communicated to the first network device; and
wherein the first network device and the second network device determine the time offset without being controlled by a central device.

18. The method of claim 17, wherein the first network device and the second network device are base transceiver stations.

19. The method of claim 17, wherein:
the first estimated delay information includes a first maximum delay that is greater than or equal to any of a first plurality of network delay measurements collected by the first network device;
the second estimated delay information includes a second maximum delay that is greater than or equal to any of the second plurality of network delay measurements collected by the second network device; and
the time offset is greater than or equal to the first maximum delay and the second maximum delay.

* * * * *